April 23, 1946.  H. T. NEUMANN  2,398,804
METHOD AND MEANS FOR TREATING MOTION PICTURE FILM
Filed July 17, 1941  3 Sheets-Sheet 1
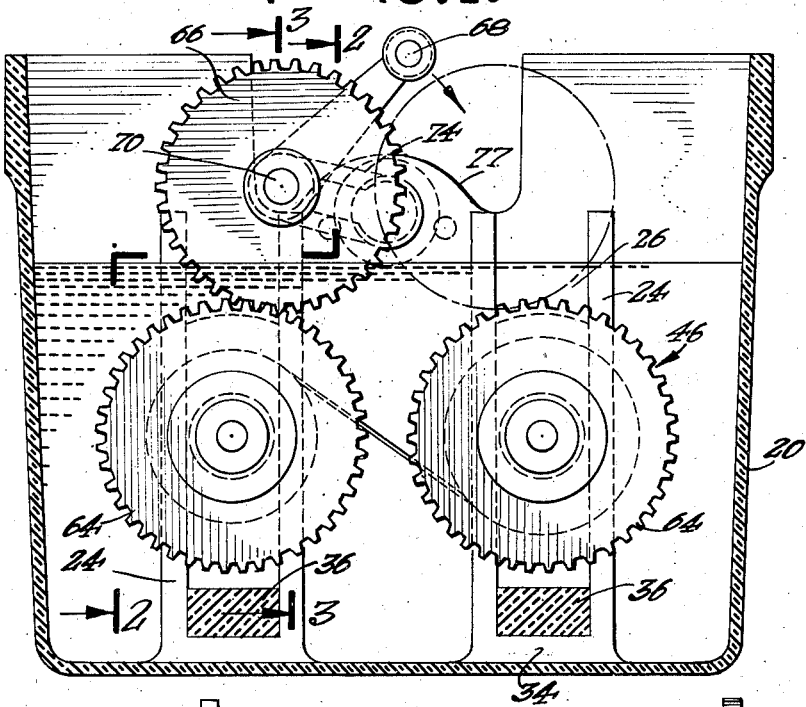
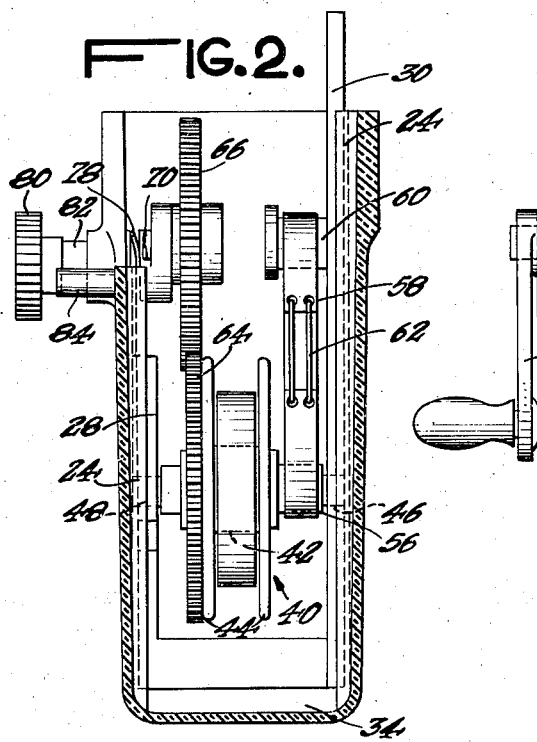
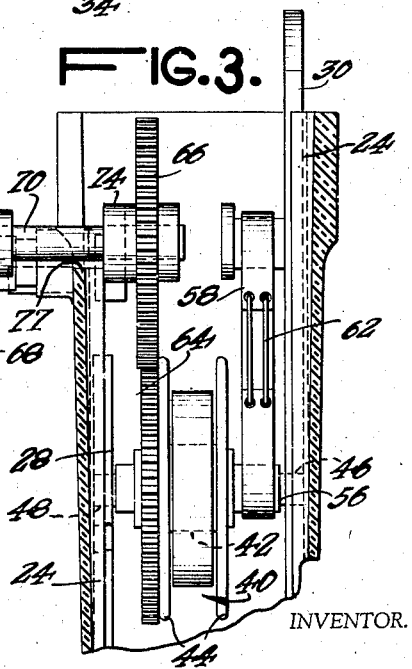
INVENTOR.
HENRY T. NEUMANN
BY
ATTORNEY.

April 23, 1946.   H. T. NEUMANN   2,398,804
METHOD AND MEANS FOR TREATING MOTION PICTURE FILM
Filed July 17, 1941   3 Sheets-Sheet 2
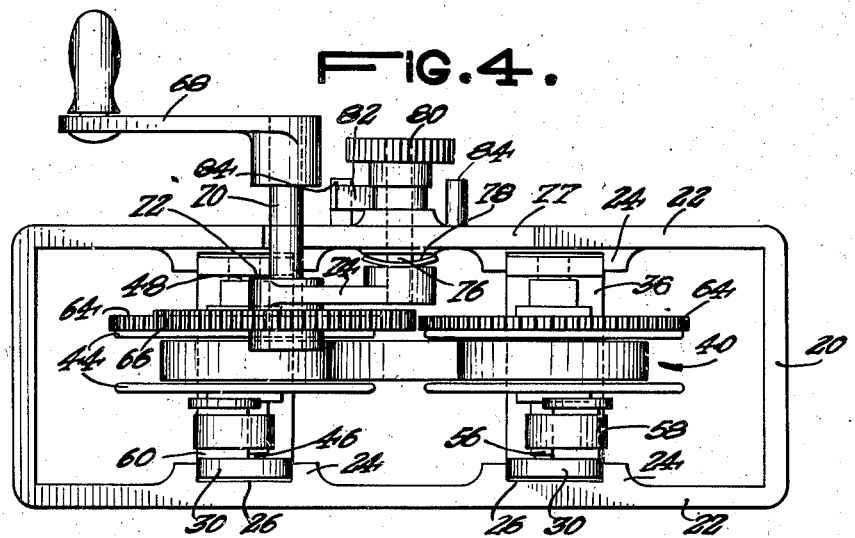
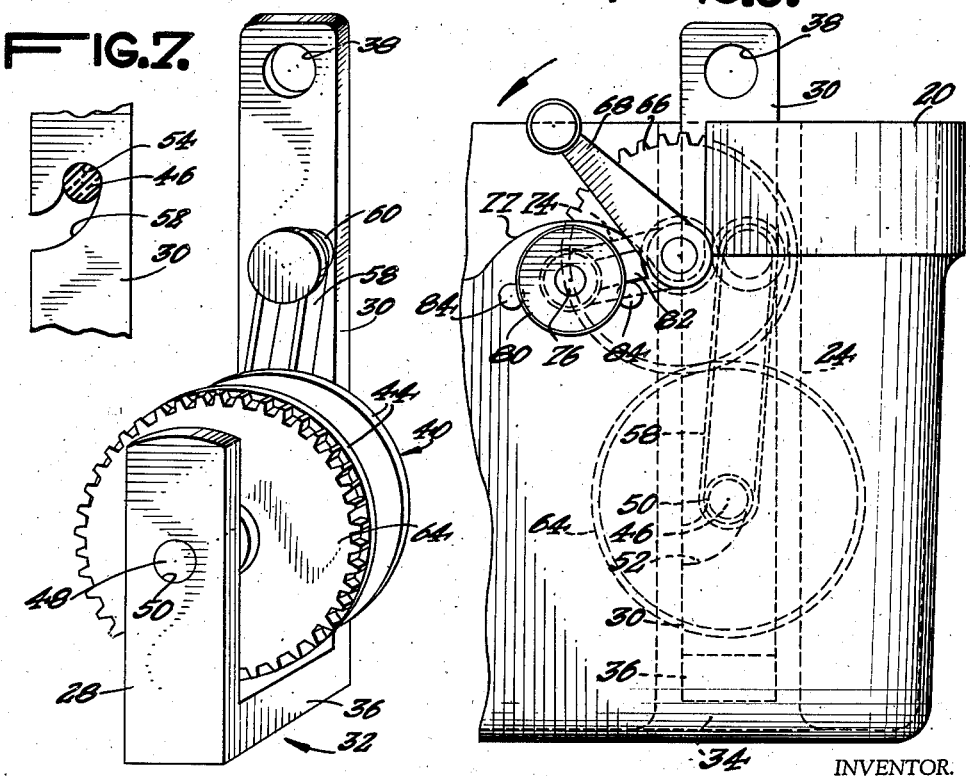
INVENTOR.
HENRY T. NEUMANN April 23, 1946.  H. T. NEUMANN  2,398,804
METHOD AND MEANS FOR TREATING MOTION PICTURE FILM
Filed July 17, 1941  3 Sheets-Sheet 3
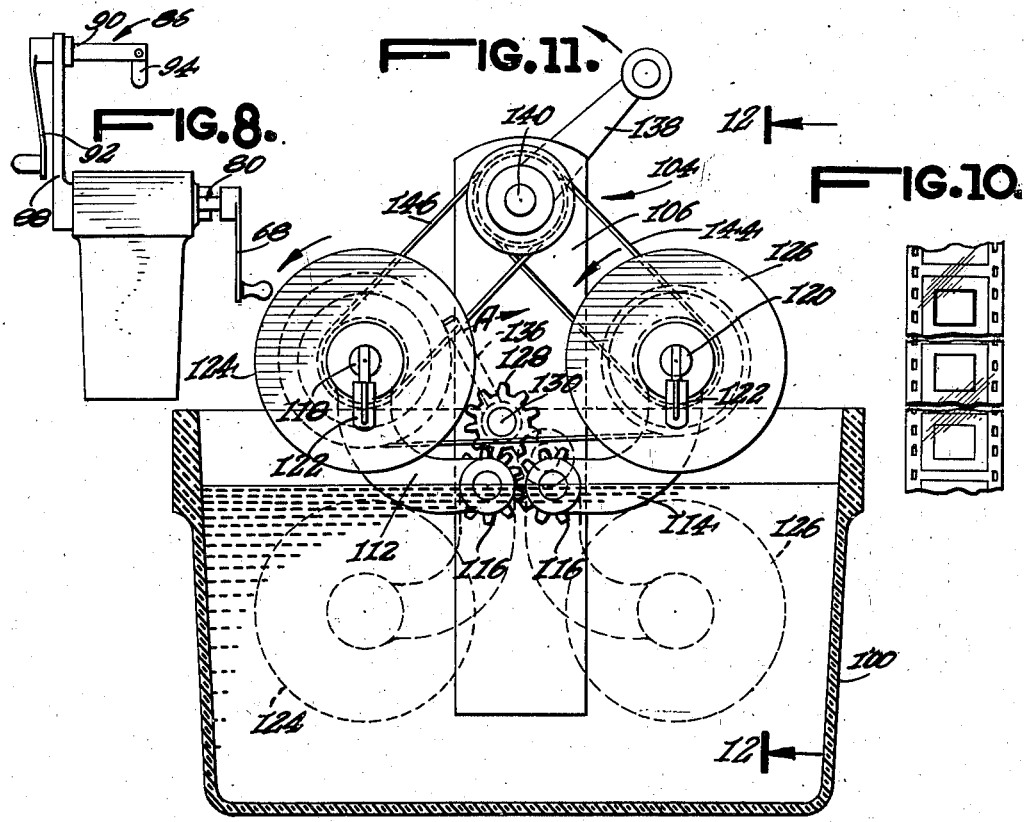
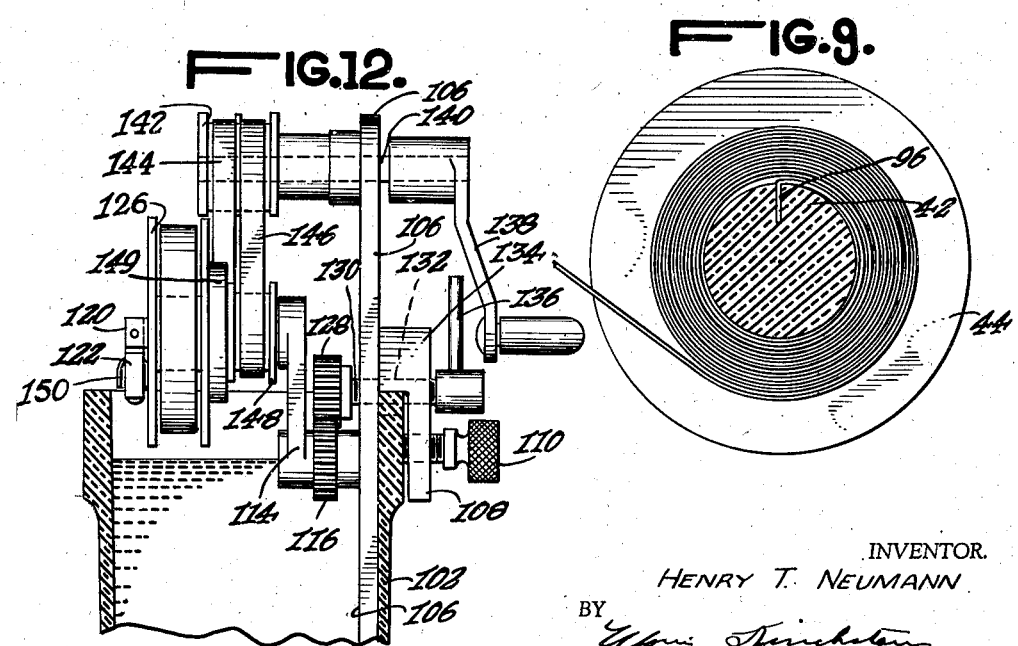
INVENTOR.
HENRY T. NEUMANN
BY
ATTORNEY.

Patented Apr. 23, 1946

2,398,804

UNITED STATES PATENT OFFICE 2,398,804

METHOD AND MEANS FOR TREATING MOTION-PICTURE FILM

Henry T. Neumann, New York, N. Y.

Application July 17, 1941, Serial No. 402,794

23 Claims. (Cl. 95—94)

This invention relates to a method and means for treating motion picture film.

In accordance with present practice, motion picture films are treated for developing, fixing, reversal printing, etc., either by passing the film through a series of tanks containing the various solutions, where long lengths of film are handled of the order, say, of from 500 to 10,000 feet; or, where small lengths of film are handled, say of the order of 50 feet, the film is suspended on any suitable apparatus which maintains the convolutions of the film spaced well apart from one another. In the former instance, the mechanism required is quite heavy and bulky and occupies considerable space. Often, in order to economize in space, the direction of travel of the film is reversed, thus necessitating additional handling and increased liability of damage to the film. Also, since the film for any particular treatment has to be continuously immersed in the treating fluid while the film is moving through a particular portion of the apparatus, relatively large amounts of fluid have to be employed, thus rendering the process quite uneconomical, since the fluids such as the developers and the like deteriorate on standing. In the aforementioned process for treating small lengths of film, difficulty has been encountered in properly arranging the film on the apparatus from which it is suspended and to keep it on the apparatus while immersed in the bath.

It is an object of my invention to provide a method and means for treating motion picture film which combines the best features of the aforesaid methods and eliminates the aforementioned and other difficulties and disadvantages. Accordingly, my apparatus is light, small and portable, but nevertheless can handle extremely long as well as relatively short lengths of motion picture film.

Another object of my invention is to provide a method and means of the character described which shall subject film to the least possible handling and thereby minimize the possibility of damaging the film during treatment.

A further object of my invention is to provide a method and means of the character described whereby the entire length of the film may be treated in a series of steps and the treatment may be halted at any step in which the operator considers the treatment has been sufficiently far advanced.

An additional object of my invention is to provide an apparatus of the character described which shall be simple to manufacture and use, and whereby exceedingly good results shall be attained.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In general, I carry out my invention by passing the exposed film as it is unwound from its reel through a treating liquid onto another reel disposed beneath the surface of the liquid. During the process, a drag is imparted to the reel from which the film is being unwound, so that the film is rewound under tension, and the succeeding spiral layers lie in close proximity. As succeeding layers are spiraled upon each other, the treating liquid is dragged between said layers at the point of contact between the flat strip of film and the reel. This liquid is squeezed out by the tension imparted to the film until the liquid lying between adjacent convolutions forms a very thin sheet whose thickness is of capillary dimensions. The chemicals contained in this thin liquid sheet will act upon the film to process the same while disposed in convolutions on the reel, and after the chemicals in the local portion of the fluid sheet have been exhausted they will not further react upon the film. The body of the liquid in which the reel of film is immersed will not affect the film since, due to the extreme thinness of the sheet of liquid between the adjacent spiraled layers, the body of the fluid will be unable to penetrate or pass between the said convoluted layers.

After the film has been wound up on a submerged reel, it is rewound on another reel also submerged in the said fluid, and the action which takes place during the winding on the first reel will thus be repeated. To facilitate the procedure, it is advantageous to wind back and forth between two reels submerged in the treating fluid, although if for any reason it is desired to have one of the reels above the surface of the fluid, my process may be practiced in such manner.

Due to the pressure exerted on the thin sheet of treating liquid disposed between successive convoluted layers of motion picture film, the said liquid is forced under pressure into the gelatinous layer coated on the film base and thereby accelerates the treatment.

As in some instances the fluid in which the film is being treated contains ingredients which tend to break down the micellar structure of the gelatin, I prefer to employ in such liquids a substance which will retard this disintegration of the gelatin and tend to harden the same.

In the accompanying drawings, in which are shown several possible embodiments of this invention:

Fig. 1 is a vertical sectional view through a film treating apparatus embodying my invention;

Figs. 2 and 3 are sectional views taken substantially along the lines 2—2 and 3—3 of Fig. 1;

Fig. 4 is a top plan view thereof;

Fig. 5 is a fragmentary side elevational view thereof;

Fig. 6 is a perspective view of one of the reel supports;

Fig. 7 is an enlarged detail showing how one end of the reel is journalled in said support;

Fig. 8 is a schematic end elevational view of the apparatus showing the location of the support for a reel of untreated film.

Fig. 9 is a sectional view through a submerged reel in the process of winding, the spacing between the convoluted layers of film being somewhat exaggerated;

Fig. 10 is a plan view of a motion picture film showing the variation of development densities at the end of what is hereinafter defined as an odd pass through a developing solution;

Fig. 11 is a view similar to Fig. 1 of an apparatus embodying a modified form of my invention; and Fig. 12 is a sectional view taken substantially along the line 12—12 of Fig. 11.

Referring now in detail to the drawings and more particularly to Figs. 1–10, I have there shown a film treating apparatus capable of handling film in accordance with my invention. Said apparatus comprises a relatively narrow tank 20 which is long enough and deep enough to hold two horizontally aligned co-planar reels which are sufficiently large to accommodate the longest length of film desired to be wound upon the particular model of the apparatus. The tank is preferably fabricated from a chemically inert material, such as for example a phenolic formaldehyde resin which is unaffected by any of the various chemicals employed during the several processes of film treatment, including developing, fixing, printing, reversal, etc.

Since the other parts of the apparatus are also exposed to liquids contained in the tank, I prefer to fabricate them too from the same or like material.

Integrally molded on the side walls 22 of the tank 20 are a plurality of spaced parallel ribs 24, oppositely disposed pairs of which form guide channels 26 in which are slidably received the upstanding arms 28 and 30 of a reel support 32. The lower portion of the channel 26 may be filled by a block 34 which runs between opposite channels 26 and on which the base 36 of the reel support 32 rests. The longer arm 30 of the reel support extends beyond the upper edge of the tank 20 when the said support is disposed in operative position in said tank. In order to facilitate withdrawal of the support 32 from the tank, I have provided an aperture 38 in each of the long arms 30, large enough to permit insertion of a finger.

Each of a pair of reels 40 rotatably received in a reel support 32 comprises a core 42 on which are integrally formed a pair of parallel circular webs or discs 44. Extending outwardly from the webs are a pair of stub shafts 46 and 48 rotatably held in the support 32. For this purpose, there is provided in one arm 28 of said support an aperture 50 in which the shaft 48 is received. Due to the fact that when the reel is manually inserted into the support 32 it is tipped with respect to the longitudinal axis of the aperture 50, this aperture is flared inwardly or is made slightly oversized. The other shaft 46 is received in a bayonet slot 52 cut in the arm 30.

To keep the shaft 46 at the upper end 54 of the bayonet slot, suitable supporting means are provided. Such means may comprise an enlarged portion 56 on the shaft 46. This enlarged portion rests in the lower loop of a band 58 whose upper loop is supported on a button-ended shaft 60 projecting from the arm 30. The said band may be fabricated from the aforesaid phenolic formaldehyde resin, but is made so thin as to be flexible and secure a good grip on the enlarged shaft portion 56, in order to cause drag upon the shaft when the same is turning freely. One portion of the loop may be cut out and replaced by a pair of rubber bands 62 to increase tension in the loop, and thus increase the drag upon the reel 40.

Means is also provided to selectively rotate either of the reels 40. Such means may comprise a gear 64 integrally formed on one of the webs 44 of each reel. These gears are adapted to engage a pinion 66 which may be power driven or manually actuated by a crank 68 disposed externally of the tank 20. In order to permit rotation of the said crank 68 to optionally turn either of the reels 40, the following mechanism is provided:

The handle 68 is mounted for rotation with a shaft 70 on which the pinion 66 is also fixed. This shaft 70 is journalled in a bearing 72 integrally formed at one end of a swing arm 74. The other end of the arm 74 is fixedly mounted on a selecting shaft 76 journalled in the side wall 22 of the tank 20. The length of the arm 74 is such that, upon rotation of the shaft 76 to the limit of its movement in either direction, the pinion 66 will engage the gear 64 on either the right or left reel 40. The side wall 22 of the tank is cut away as at 77 to provide an unobstructed path for movement of the shaft 70.

Chattering of the pinion 66 caused by angular vibration of the shaft 76 and arm 74 may be prevented by employing an arcuate annular spring 78 which is held under compression between the end of the arm 74 fixed to the shaft 76 and the adjacent portion of the wall 22.

To simplify the rotation of the shaft 76 and selection of the position of the pinion 66 inside of the tank 20, a ribbed knob 80 is fixedly mounted on the portion of the shaft 76 projecting exteriorly of the tank 20. Also mounted upon this portion of the shaft 76 is an indicator arm 82. Stops 84 are disposed in the path of travel of the arm 82 to limit angular rotation of the shaft 76 and prevent the teeth of the pinion 66 from meshing too deeply with the teeth of the gears 64, thus preventing possible binding or undue wear of the gear train.

A support 86 (see Fig. 8) for a reel of film to be treated is provided on the wall of the tank 20 opposite that in which the selector shaft 76 is journalled. Said support may compromise a standard 88 held in any suitable manner to the tank 20. At the upper end of the standard is journalled a shaft 90 having a handle 92. The opposite end of the shaft is provided with a reel locking device 94 of any type well known to the art.

In order to explain the operation of my apparatus, it will be assumed that the step of treatment to which the film is to be subjected is that of developing. A complete winding of the film through the treating solution on to a reel will be referred to as one pass.

First, a suitable developing solution is prepared for insertion in the tank 20. By way of example, and without limiting myself thereto, the following comprises a typical developing solution which I have found to give good results:

| | | |
|---|---|---|
| Water | cc | 1000 |
| Metol | grams | 10 |
| Sodium sulphite | do | 84 |
| Hydroquinone | do | 10 |
| Borax | do | 40 |
| Sodium sulphate | do | 30 |
| Potassium bromide | do | 2 |
| Sodium carbonate | do | 15 |
| Enough water to make | cc | 4,000 |

Only enough of this solution is used to fill the tank to a level above the reels 40 when same have been positioned with the bases 36 thereof in contact with the blocks 34. It will be noted that this developing solution is standard in all respects, except the use of sodium sulphate. As will be soon apparent, the film being treated is disposed below the surface of the treating fluid for appreciable periods of time and the treating fluid is forced into the sensitive layers covering the base of the film under such pressure that its action is accelerated. Since under these circumstances an ordinary treating fluid, which has an alkalinity sufficiently high to open up the gelatinous carrier layer enough to allow the developing agents to act upon the photo-sensitive particles supported in said layer, tends to break down the micellar structure of said gelatinous layer, it is necessary to provide a hardener to prevent such degradation. I have found that sodium sulphate in the relative amounts above set forth suffices to either inhibit the softening action of the alkaline components of the developing solution or to so harden the gelatin film that it will not be unduly softened or disintegrated even upon long or repeated exposure of the film to alkaline solutions.

The tank with the liquid treating fluid therein is taken into a dark room and a reel of exposed film to be treated placed upon the shaft 90. The free end of the film is placed into a holding slot 96, on the core 42 of the reel 40. The selector knob 80 is now manipulated to engage the pinion 66 and gear 64 on the reel 40 to which the free end of the film has been attached. Thereupon, the crank 68 is manually rotated at a fairly rapid speed until all the film has been unwound from the reel journalled on the shaft 90 and on to the reel 40. If at this time the film should be taken out of the bath and examined, it will be found that the portions of the film closest to the core 42 already show an appreciable development of the latent image. As the film is examined along its length in a direction towards the free end of the strip, it will be found that the degree of development decreases at a substantially uniform rate and the free end after the first pass will show substantially no development (see Fig. 10). If, before examining the film after the first pass, the film is left upon the reel for a short time (a little over one minute), it will be seen that a uniform amount of development has occurred throughout the entire length of the film. If the gears are so proportioned and the speed of rotation of the handle so controlled that it takes approximately one minute to roll the full length of film from one reel to another, the uniform gradation of development density above noted will be observed. If, however, these factors are so altered that a longer period of time is required to wind up the film upon the submerged reel, it will be noted that the initial portions of the film adjacent the core 42 have a uniform developed density and that only the subsequent portion of the film, which represents approximately the last minute of winding, will have a variation in developed density. Moreover, if the wound film should be left for substantial periods of time in the developing solution, once the aforementioned density of development has been attained at any given pass additional time of standing will not increase said density.

The various periods of time above mentioned are those actually determined by test of my apparatus. However, that these periods of time will be altered by change in the developer, speed of wind, amount of drag and characteristics of the film, will be apparent.

Since the only liquid which acts upon a local portion of the film at any pass is that which is caught and held between successive convoluted layers of film, when the chemicals in this portion of the liquid sheet are exhausted no further development or treatment of the film will occur. That such is the case is further borne out by the fact that when the tension imparted to the reel being unwound is varied by changing the length of the rubber bands 62 in the loop, the developing density of the film is altered. For example, when the tension is decreased, the developed density of the film is increased after any given pass, and vice versa.

Ordinarily, I believe it inadvisable and a waste of time to allow the film after a pass to remain on a reel until a uniform developed density has been obtained. The developed density may be evened out by turning the knob 80 until the arm 82 strikes the other stop 84 and then winding the film on the other submerged reel 40. Since during the second pass the film will again be subjected to a graded developing, opposite to that imparted to the film during the first pass, the developed density of the film at the end of the second or any evenly numbered pass will be uniform. The film may be examined at each pass to see if developing has been carried far enough. In an apparatus and developing solution such as described, I have found that four passes, each one minute long, gave satisfactory results. The total time of development, four minutes, is a much shorter period of time than that in which the same film could be developed by hand or by use of present-day apparatus, being due to the pressure exerted on the fluid sheet during winding which drives the treating liquid into the gelatine carrier layer.

Many passes of the film may be made in my apparatus without in any way harming the film base or the gelatinous coating, since the film is subjected to an absolute minimum of handling in passing from one submerged reel to the other. Moreover, due to the extremely short length of film exposed to the bulk of the treating fluid at any one time, the apparatus is extremely compact and its size is almost entirely determined by the maximum amount of film desired to be treated in any specific model. It will be apparent that the apparatus is so small as to be easily portable and requires small space.

Suitable auxiliary equipment, such as is well known to the art, may be provided in order to accommodate my apparatus to the several photographic processes which include treatment of the film in a liquid medium, as for example an actinic light for film exposure during reversal.

In Figs. 11 and 12 I have shown another embodiment of my invention, which differs from the embodiment shown in Figs. 1–10 in that the driving train between the crank and the submerged reels is permanently connected, and means is provided to raise the submerged reels out of the tank without manually handling the reel supports.

Said apparatus comprises a tank 100 whose size in general is controlled by the same considerations as those governing the size of the tank 20. On one side wall 102 of the tank is disposed a fixture 104 on which are mounted the reel supports and the means for actuating same. Said fixture comprises an elongated plate 106 provided with spaced finger 108 and clamping screw 110 by which the fixture is held to the tank. Journalled on the plate 106 are a pair of reel supporting arms 112 and 114, each of which carries a gear 116 at its pivoted end. The free ends of the arms 112 and 114 have fixed thereon reel carrying shafts 118 and 120, at the end of which are mounted the reel locks 122. Reels 124 and 126 are arranged to rotate about the shafts 118 and 120. The gears 116 are permanently in mesh with each other, and one of said gears additionally meshes with the spur gear 128 journalled in the plate 106. It will thus be seen that when the gear 128 is turned in the direction indicated by the arrow A (see Fig. 11), the parts will be lowered from their full line position, wherein the reels 124 and 126 are above the surface of the fluid in the tank 100, to the submerged position indicated by dotted lines; and that when the spur gear 128 is returned to the position illustrated in Fig. 11 the reels 124 and 126 will be raised out of the solution. In order to provide for such rotative movement of the spur gear 128 and to limit its movement so that the extreme limits of travel of the reels 124 and 126 will be in the positions indicated in solid and full lines in Fig. 11, the following structure is provided:

The gear 128 is mounted at one end of a coarsely threaded shaft 130 which is received in a tapped hole 132 in a lug 134 extending from the plate 106. The shaft 130 projects beyond the lug 134, being provided with a lever handle 136 which, by its position, indicates the angular relationship of the arms 112 and 114. Both the spur gear 128 and hub of the handle 136 are rigidly mounted upon the said shaft 130 and the spur gear 128 has a tooth face which is wider than the tooth face of the pinion 116. By virtue of this construction, when the shaft 130 is turned, its limit of rotation in one direction will be determined by abutment of the hub of the gear 128 against the plate 106, and its limit of rotation in the other direction will be determined by abutment of the hub of the handle 136 against the lug 134.

The reels 124 and 126 are driven by a crank 138 fixed to a shaft 140 journalled in the plate 106. The shaft 140 carries a pair of flanged pulleys 142 which engage two elastic belts 144 and 146. Each of these belts rides on a pulley 148 rotatably mounted on a shaft 118 or 120. Said pulleys 148 are connected to reels 124 and 126 by a one-way drive 149, such as is commonly employed in handling motion picture film, and which drives the reels through a pin and socket connection (not shown). In this manner, motion will be transmitted through the drive 149 to reel 124 when the crank is rotated in one direction, allowing reel 126 to turn freely, and when the direction of rotation of the crank is reversed the reel 126 will be positively driven through the belts while the reel 124 will be turned by the film. Thus, the direction of travel of the film between the reels 124 and 126 can be reversed by simply reversing the direction of rotation of the crank 138.

Leaf springs 150 carried by the reel locks 122 lightly frictionally engage the flanges of the reels 124 and 126 to provide a slight drag to the free turning thereof when film is being unreeled, and thus place the film being wound under tension.

Due to the ease with which the fixture 104 may be installed on or removed from the tank 100, it will be seen that after the film has been subjected to treatment in one fluid bath, such for example as developing solution, the fixture may be removed with the film to a tank having another treating bath, as for example washing or fixing, without the necessity of emptying out the fluid in the tank and replacing the same with the other fluid.

It will thus be seen that there is provided a method and means by which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In an apparatus for treating photographic film in a liquid bath which film includes a film base on which there is supported a gelatinous carrier layer having photo-sensitive particles therein, the combination of a reel submerged in said bath, means to wind film onto said reel about a horizontal axis while said reel is submerged, and means to continuously impart a uniform tension to the film being wound sufficient to force liquid caught between adjacent convoluted layers of the film into the gelatinous carrier layer whereby to enhance the treatment of said film by said bath.

2. In an apparatus for treating photographic film with a liquid which film includes a film base on which there is supported a gelatinous carrier layer having photo-sensitive particles therein, the combination of means to dispose adjacent layers of film in close proximity and means to continuously interpose a thin sheet of said liquid intermediate said adjacent layers under uniform pressure sufficient to force said liquid into the gelatinous carrier layer whereby to enhance the treatment of said film by said liquid.

3. In an apparatus for treating photographic film with a liquid which film includes a film base on which there is supported a gelatinous carrier layer having photo-sensitive particles therein, the combination of means to spirally dispose the adjacent layers of film about a horizontal axis and in close proximity and means to continuously interpose a sheet of said liquid of capillary dimensions intermediate said adjacent layers under uniform pressure sufficient to force said liquid into the gelatinous carrier layer whereby to enhance the treatment of said film by said liquid.

4. In an apparatus for treating photographic film in a liquid bath which film includes a film base on which there is supported a gelatinous carrier layer having photo-sensitive particles therein, the combination of a tank in which the liquid bath is contained, a reel, means to horizontally rotatably support said reel, means disposed externally of said bath to selectively hold said reel supporting means with said reel out of or submerged in said bath, means to rotate said reel to wind film thereon, and means to continuously impart a uniform tension to the film being wound sufficient to force liquid caught between adjacent convoluted layers of the film into the gelatinous carrier layer whereby to enhance the treatment of said film by said bath.

5. In an apparatus for treating photographic film in a liquid bath which film includes a film base on which there is supported a gelatinous carrier layer having photo-sensitive particles therein, the combination of a tank in which the liquid bath is contained, a reel, means to horizontally rotatably support said reel below the surface of the bath, means to rotate said reel to wind film thereon, and means to continuously impart a uniform tension to the film being wound sufficient to force liquid caught between adjacent convoluted layers of the film into the gelatinous carrier layer whereby to enhance the treatment of said film by said bath.

6. In an apparatus for treating photographic film in a liquid bath which film includes a film base on which there is supported a gelatinous carrier layer having photo-sensitive particles therein, the combination of a tank in which the liquid bath is disposed, a reel, means to rotatably support said reel below the surface of the bath, means to rotate said reel to wind film thereon, and means to continuously impart a uniform tension to the film being wound sufficient to force liquid caught between adjacent convoluted layers of the film into the gelatinous carrier layer whereby to enhance the treatment of said film by said bath.

7. In an apparatus for treating photographic film in a liquid bath which film includes a film base on which there is supported a gelatinous carrier layer having photo-sensitive particles therein, the combination of a tank in which the liquid bath is contained, a pair of reels, means to horizontally rotatably support said reels below the surface of the bath, means to selectively rotate either of said reels to wind film thereon, and means to continuously impart a uniform tension to the film being wound sufficient to force liquid caught between adjacent convoluted layers of the film into the gelatinous carrier layer whereby to enhance the treatment of said film by said bath.

8. In an apparatus for treating photographic film in a liquid bath which film includes a film base on which there is supported a gelatinous carrier layer having photo-sensitive particles therein, the combination of a tank in which the liquid bath is contained, a reel, means to horizontally rotatably support said reel below the surface of said bath, means to rotate said reel, a second reel, means to horizontally rotatably support said second reel above the surface of said bath whereby film can be wound from said first reel supported over the bath on to the submerged reel through said liquid bath and will pass through said bath and be wound on said submerged reel with a broad face thereof facing downwardly and with the narrow edges thereof facing horizontally, and means to continuously impart a uniform tension to the film as it is wound on said reel sufficient to force liquid caught between adjacent convoluted layers of the film into the gelatinous carrier layer whereby to enhance the treatment of said film by said bath.

9. In an apparatus for treating photographic film in a liquid bath which film includes a film base on which there is supported a gelatinous carrier layer having photo-sensitive particles therein, the combination of a tank in which the liquid bath is contained, a support mounted on said tank and movable into and out of said bath, a reel on which film is wound, means to rotatably mount said reel on said support, means to rotate said reel to wind film thereon, and means to continuously impart a uniform tension to the film being wound sufficient to force liquid caught between adjacent convoluted layers of the film into the gelatinous carrier layer whereby to enhance the treatment of said film by said bath, said support and said means for rotation of said reel being so constructed and arranged that said reel may be rotated only when immersed in said bath.

10. In an apparatus for treating reeled photographic film in a liquid bath which film includes a film base on which there is supported a gelatinous carrier layer having photo-sensitive particles therein, means for supporting the reel of film beneath the surface of the bath, means for supporting a second reel beneath the surface of the bath, and means for winding the exposed film onto said second reel and through said bath under a continuously applied uniform tension sufficient to force into said gelatinous carrier layer liquid from a thin capillary sheet of the liquid caught between adjacent convolutions of the film as it is wound on said second reel whereby to enhance the treatment of said film by said bath.

11. In an apparatus for treating photographic film in a liquid bath which film includes a film base on which there is supported a gelatinous carrier layer having photo-sensitive particles therein, the combination of a tank in which the liquid bath is contained, means for supporting a pair of reels beneath the surface of said bath, said reels being adapted to have film spirally wound thereon with one end of the film attached to one of said reels and the other end of the film attached to the other of said reels, means to rotate one of said reels, and drag means associated with the other of said reels so that the film is continuously wound on said one reel under uniform tension sufficient to force liquid caught between adjacent convoluted layers of the film into the gelatinous carrier layer whereby to enhance the treatment of said film by said bath.

12. In an apparatus for treating photographic film in a liquid bath which film includes a film base on which there is supported a gelatinous carrier layer having photo-sensitive particles therein, the combination of a tank in which the liquid bath is contained, means for supporting a pair of reels beneath the surface of said bath, said reels being adapted to have film spirally wound thereon with one end of the film attached to one of said reels and the other end of the film attached to the other of said reels, means to rotate said reels, and drag means associated with said reels such that film is continuously wound on said reels under uniform tension sufficient to force liquid caught between adjacent convoluted layers of the film into the gelatinous carrier layer whereby to enhance the treatment of said film by said bath.

13. In an apparatus for treating photographic film with a liquid which film includes a film base on which there is supported a gelatinous carrier layer having photo-sensitive particles therein, the combination of a reel on which the film is to be wound, means to wind the film about a horizontal axis in adjacent convoluted layers on the reel with a thin sheet of the liquid interposed between said adjacent convoluted layers, and means to continuously impart a uniform tension to the film being wound sufficient to force liquid from such sheet into the gelatinous carrier layer whereby to enhance the treatment of said film by said bath.

14. In a method for treating in a liquid bath photographic film including a gelatinous carrier layer having photo-sensitive particles therein, that improvement comprising the step of winding the film in horizontal position onto a reel under the surface of the bath while continuously imparting a uniform tension to the film being wound sufficiently to force liquid caught between adjacent convoluted layers of the film into the gelatinous carrier layer whereby to enhance the treatment of said film by said bath.

15. In a method for treating photographic film including a gelatinous carrier layer having photo-sensitive particles therein, that improvement comprising the step of disposing adjacent layers of film in close proximity with a thin sheet of a treating fluid under pressure therebetween sufficient to force the same into the gelatinous carrier layer whereby to enhance the treatment of said film by said bath.

16. In a method for treating photographic film including a gelatinous carrier layer having photo-sensitive particles therein, that improvement comprising the steps of disposing adjacent layers of film in close proximity, disposing a sheet of a treating fluid of capillary thickness intermediate said layers, and placing said sheet under sufficient pressure to force fluid from the same into the gelatinous carrier layer whereby to enhance the treatment of said film by said bath.

17. In a method for treating in a liquid bath photographic film including a gelatinous carrier layer having photo-sensitive particles therein, that improvement comprising the steps of winding the film onto a reel under the surface of the bath while continuously imparting a uniform tension to the film being wound sufficient to force liquid caught between adjacent convoluted layers of the film into the gelatinous carrier layer whereby to enhance the treatment of said film by said bath, and then winding the film from said reel under similar tension onto another reel also under the surface of the bath.

18. In a method for treating in a liquid bath photographic film including a gelatinous carrier layer having photo-sensitive particles therein, that improvement comprising the steps of winding the film onto a reel under the surface of the bath under a continuously applied tension sufficient to force liquid caught between adjacent convoluted layers of the film into the gelatinous carrier layer whereby to enhance the treatment of said film by the bath, and then winding the film from said reel and under similar tension onto another reel also under the surface of the bath.

19. In a method for treating in a liquid bath photographic film including a gelatinous carrier layer having photo-sensitive particles therein, that improvement comprising the steps of winding the film onto a reel under the surface of the bath while continuously imparting a uniform tension to the film being wound sufficient to force liquid caught between adjacent convoluted layers of the film into the gelatinous carrier layer whereby to enhance the treatment of said film by said bath, then winding the film from said reel in horizontal position and under similar tension onto another reel also under the surface of the bath, and continuing to wind the film back and forth between the reels until treatment of the film is finished.

20. In a method for treating in a liquid bath photographic film including a gelatinous carrier layer having photo-sensitive particles therein, that improvement comprising the steps of winding the film onto a reel under the surface of the bath while continuously imparting a uniform tension to the film being wound sufficient to force liquid caught between adjacent convoluted layers of the film into the gelatinous carrier layer whereby to enhance the treatment of said film by said bath, winding the film from said reel under similar tension onto another reel also under the surface of the bath before said liquid has fully treated the last portion of the film wound onto the reel, and continuing to similarly wind the film back and forth between the reels an even number of times.

21. In a method for developing photographic film including a film base on which there is supported a gelatinous carrier layer having photo-sensitive particles therein, that improvement comprising the steps of winding the film in strip form onto a reel under the surface of a liquid alkaline developing bath which opens said gelatinous carrier layer to allow developing agents to act upon said photo-sensitive particles but which tends to break down the micellar structure of said gelatinous layer when said strip is so wound, said bath having a softening inhibiting agent therein to prevent micellar degradation of said carrier layer, continuously imparting a uniform tension to the film being wound sufficient to force liquid from the bath caught between adjacent convoluted layers of the film into the gelatinous carrier layer whereby to enhance the developing action of said bath, winding the film from said reel onto another reel also under the surface of the bath and continuing to wind the film back and forth between the reels until treatment of the film is finished, the treatment being of such length as to cause micellar degradation of the gelatin were it not for the presence of the softening inhibiting agent in the bath.

22. In a method for developing photographic film including a film base on which there is supported a gelatinous carrier layer having photo-sensitive particles therein, that improvement comprising the steps of winding the film in strip form under tension onto a reel under the surface of a liquid alkaline developing bath which opens said gelatinous carrier layer to allow developing agents to act upon said photo-sensitive particles but which tends to break down the micellar structure of said gelatinous layer when said strip is so wound, said bath having a hardening agent therein to prevent micellar degradation of said carrier layer, continuously imparting a uniform tension to the film being wound sufficient to force liquid from the bath caught between adjacent convoluted layers of the film into the gelatinous carrier layer whereby to enhance the developing action of said bath, winding the film from said reel onto another reel also under the surface of the bath and continuing to wind the film back and forth between the reels until treatment of the film is finished, the treatment being of such length as to cause micellar degradation of the gelatin were it not for the presence of the hardening agent in the bath.

23. In a method for developing photographic film including a film base on which there is supported a gelatinous carrier layer having photo-sensitive particles therein, that improvement comprising the steps of winding the film in strip form under tension onto a reel under the surface of a liquid alkaline developing bath which opens said gelatinous carrier layer to allow developing agents to act upon said photo-sensitive particles but which tends to break down the micellar structure of said gelatinous layer when said strip is so wound, said bath having sodium sulphate therein, continuously imparting a uniform tension to the film being wound sufficient to force liquid from the bath caught between adjacent convoluted layers of the film into the gelatinous carrier layer whereby to enhance the developing action of said bath, winding the film from said reel onto another reel also under the surface of the bath and continuing to wind the film back and forth between the reels until treatment of the film is finished, the treatment being of such length as to cause micellar degradation of the gelatin were it not for the presence of the sodium sulphate in the bath.

HENRY T. NEUMANN.